United States Patent
Marupaduga et al.

(10) Patent No.: US 11,172,378 B1
(45) Date of Patent: Nov. 9, 2021

(54) DYNAMIC SYNCHRONIZATION SIGNAL BLOCK BEAM OPTIMIZATION

(71) Applicant: T-MOBILE INNOVATIONS LLC, Overland Park, KS (US)

(72) Inventors: Sreekar Marupaduga, Overland Park, KS (US); Rajveen Narendran, Olathe, KS (US); Vanil Parihar, Overland Park, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 16/897,446

(22) Filed: Jun. 10, 2020

(51) Int. Cl.
*H04W 76/27* (2018.01)
*H04W 72/04* (2009.01)
*H04W 16/28* (2009.01)
*H04B 17/336* (2015.01)
*H04W 24/02* (2009.01)

(52) U.S. Cl.
CPC .......... *H04W 16/28* (2013.01); *H04B 17/336* (2015.01); *H04W 24/02* (2013.01)

(58) Field of Classification Search
None
See application file for complete search history.

(56) References Cited

U.S. PATENT DOCUMENTS

2020/0329524 A1* 10/2020 Park .................... H04W 72/042
2020/0337004 A1* 10/2020 Li .......................... H04W 24/08

* cited by examiner

*Primary Examiner* — Gary Lafontant

(57) ABSTRACT

Methods are provided for dynamically modifying an SSB beam configuration. SINR and/or other network efficiency parameters are monitored at a cell site. It is determined that the SINR or other network efficiency parameter is lower than a threshold value. The current SSB beam configuration of the cell site is compared with other potential SSB beam configurations. Based on the comparing, an SSB beam configuration is compared with an optimal side lobe antenna gain and back lobe antenna gain to avoid interference with adjacent cell sites. In response to the identifying, the SSB beam configuration at the cell site is dynamically modified.

20 Claims, 5 Drawing Sheets

DYNAMIC SYNCHRONIZATION SIGNAL BLOCK BEAM OPTIMIZATION

SUMMARY

A high-level overview of various aspects of the invention are provided here for that reason, to provide an overview of the disclosure and to introduce a selection of concepts that are further described in the detailed-description section below. This summary is not intended to identify key features or essential features of the claimed subject matter, nor is it intended to be used as an aid in isolation to determine the scope of the claimed subject matter.

In brief and at a high level, aspects are provided for dynamically modifying the synchronization signal block (SSB) beam configuration for a sector of a cell site when side lobe and/or back lobe antenna gain is degraded. In this case, one or more network efficiency parameters that are monitored by the cell site or a component thereof (e.g., eNodeB, gNodeB) are used to select an optimal SSB beam configuration at that time. For instance, the current SSB beam configuration may be two beams, and could be dynamically modified to four beams, one beam, six beams, etc. The number of beams depends on, in one aspect, network efficiency parameters, such as signal-to-interference-plus-noise ratio (SINR). Throughput is another exemplary network efficiency parameter that may be used in the selection of an optimal SSB beam configuration.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
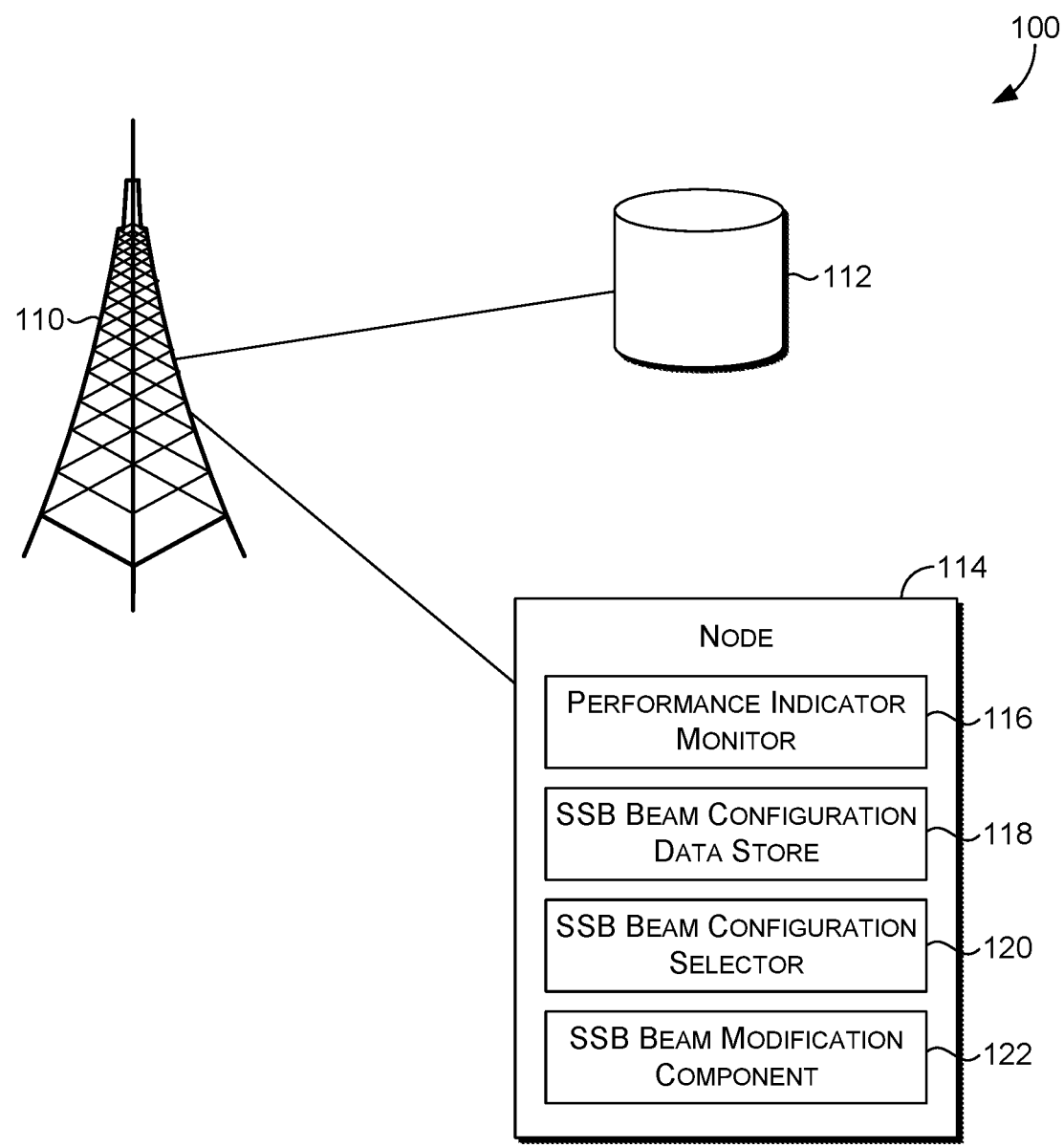
FIG. 1 depicts an example of a network environment in accordance with one or more embodiments.

The subject matter of select embodiments of aspects herein is described with specificity herein to meet statutory requirements. But the description itself is not intended to define what we regard as our invention, which is what the claims do. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" can be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which can be used to store the desired information and which may be accessed by the computing device 500 shown in FIG. 5. Computer storage media does not comprise a signal per se.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter.

The terms "user equipment," "UE," and "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

Synchronization signal blocks (SSBs), also referred to as synchronization signals, are a transmission sent by an antenna element, antenna array, or antenna at a cell site. In some aspects, the SSB may be an NR-5G specific SSB. SSBs typically consist of three components, including a primary synchronization signal, secondary synchronization signal, and a broadcast channel. SSBs are used for synchronization, cell searching, and initial beamforming. Typically, SSBs are sent in repetition, such as in bursts. In one aspect, during Massive MIMO deployment, such as when a network operator would select a particular number of SSB beams used at the particular cell site, a cluster level analysis and side/back lobe antenna gain impact to neighboring sectors would not be performed. Instead, a generic SSB beam configuration is implemented across the market or network contributing to a less than optimal network coverage.

SSB beams, as used herein, refer to the beams that are formed by the antennas in the antenna array of a cell site. For example, in a 128 antenna array, some or all of these antennas are used to form the SSB beams. An SSB beam configuration refers to the quantity of beams formed by the antennas of the antenna array. In some aspects, the quantity of beams could be one, two, four, six, and larger.

Instead of the typically static SSB beam configuration utilized at a cell site, aspects herein provide for dynamically modifying the SSB beam configuration at a cell site based on one or more factors. For example, based on the back and side lobe gain impact to neighboring cell sites, and based on loading, SINR, and other network operating parameters, an SSB beam configuration may be selected at any time during operation of the cell site. For example, if the overall SINR is degraded on a given sector of the cell site, a different SSB beam configuration may be selected that has less side and back lobe antenna gain on adjacent sectors to improve the SINR on the degraded sector. In another aspect, if an SSB beam configuration has 4 beams, but it is causing more side lobe and back lobe antenna gain compared to an SSB beam configuration having six beams, the SSB beam configuration of six beams may dynamically be selected such that the SSB beam configuration of that sector is dynamically modified from four beams to six beams.

In one aspect, a method is provided for dynamically modifying an SSB beam configuration. The method includes monitoring SINR at a cell site, determining that the SINR is lower than a threshold value, comparing a current SSB beam configuration of the cell site with other potential SSB beam configurations, and based on the comparing, identifying an SSB beam configuration with an optimal side lobe antenna gain and back lobe antenna gain to avoid interference with adjacent cell sites. Further, the method includes, in response to the identifying, dynamically modifying the SSB beam configuration at the cell site.

In another aspect, computer-readable storage media having computer-executable instructions embodied thereon is provided that, when executed by one or more processors, cause the processors to perform a method. The method includes determining that an SINR is lower than a threshold value, comparing a current SSB beam configuration of the cell site with other SSB beam configurations that are operational at the cell site, and selecting an SSB beam configuration from the other SSB beam configurations. The selected SSB beam configuration has an improved side lobe antenna gain and back lobe antenna gain to avoid interference with adjacent cell sites. Further, the method includes dynamically implementing the selected SSB beam configuration at the cell site.

In yet another aspect, a method is provided for dynamically modifying an SSB beam configuration. The method includes determining a first period of time when a quantity of a first set of user devices connected to a cell site is historically greater than a first threshold, and determining a second period of time when a quantity of a second set of user devices connected to the cell site is historically less than a second threshold. Further, the method includes, upon an initiation of the first period of time, dynamically modifying a current SSB beam configuration to a first SSB beam configuration, and upon an initiation of the second period of time, dynamically modifying the current SSB beam configuration to a second SSB beam configuration.

Beginning with FIG. 1, an example of a network environment 100 suitable for use in implementing embodiments of the present disclosure is provided. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 includes a network (not shown) that provides service to user equipment (UEs). The network may be accessible through cell site 110, which includes several components, including a base station. The base station and/or a computing device (e.g., whether local or remote) associated with the base station may manage or otherwise control the operations of components of a cell site, including an antenna array located within cell site 110. The base station and/or the computing device associated with the base station may include one or more processors and computer-readable storage media having computer-executable instructions or computer instruction modules embodied thereon for execution by one or more processors.

The antenna array associated with cell site 110 may radiate in a particular direction and thus may correspond to a particular sector of a cell site. The antenna array may have a plurality of antenna elements, in embodiments. In one embodiment, the antenna array is configured to have a plurality of elements that in number, arrangement, and/or density, are configured for mMIMO. In one such embodiment, the base station may include a radio and/or a controller, such as a Massive Multiple-Input Multiple-Output Unit (MMU) for controlling a mMIMO configured antenna array. The base station may use the controller to monitor one or more network operation parameters, including throughput, signal quality metrics (e.g., SINR), a quantity of unique users/subscribers, etc.

As shown in FIG. 1, cell site 110 communicates at least with a database 112 and a node 114, which could be an Evolved Node B (i.e., "eNodeB" or "eNB") or a Next Generation Node B (i.e., "gNodeB" or "gNB"). Node 114 includes a performance indicator monitor 116, an SSB beam configuration data store 118, an SSB beam configuration selector 120, and an SSB beam modification component 122. Initially, node 114 or another network component not shown herein (e.g., element management system) is generally responsible for monitoring network performance conditions, accessing a database for potential SSB beam configurations that can be used, and for selecting the optimal SSB beam configuration.

Performance indicator monitor 116 monitors various network performance parameters, such as SINR, throughput, etc. These network performance parameters are factors used in the dynamic selection of an SSB beam configuration at a cell site. For cell sites, or for a sector of a cell site, the node 114, and specifically the performance indicator monitor 116 communicates to the node 114 to assist the node 114 in selecting the optimal SSB beam configuration. In one aspect, at a sector, for example, of cell site 110, if the side lobe and back lobe gain are not optimal and perhaps interfering with adjacent sectors or cell sites, node 114 may request current values for various network performance parameters from monitor 116. If a network performance parameter is degraded, above a threshold, below a threshold, etc., node 114 may access a database, such as SSB beam configuration data store 118 or separate database 112 to evaluate other potential SSB beam configurations for that sector or cell site 110.

Once node 114 has evaluated the potential SSB beam configurations, SSB beam configuration selector 120 selects the SSB beam configuration that provides the optimal back lobe and side lobe gain, as well as other factors (e.g., SINR). As such, instead of the SSB beam configuration being set up during cell site/antenna installation, aspects provide for opportunities to dynamically (e.g., during cell site operation) modify the SSB beam configuration to provide more optimal side lobe/back lobe gains and network performance parameters. Once selected, the SSB beam modification component 122 communicates an instruction to modify the SSB beam configuration.

Having described the network environment 100 and components operating therein, it will be understood by those of ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Having described the network environment 100, methods are discussed that can be performed within the network environment 100 and using the components discussed in FIG. 1.

Figure 2:
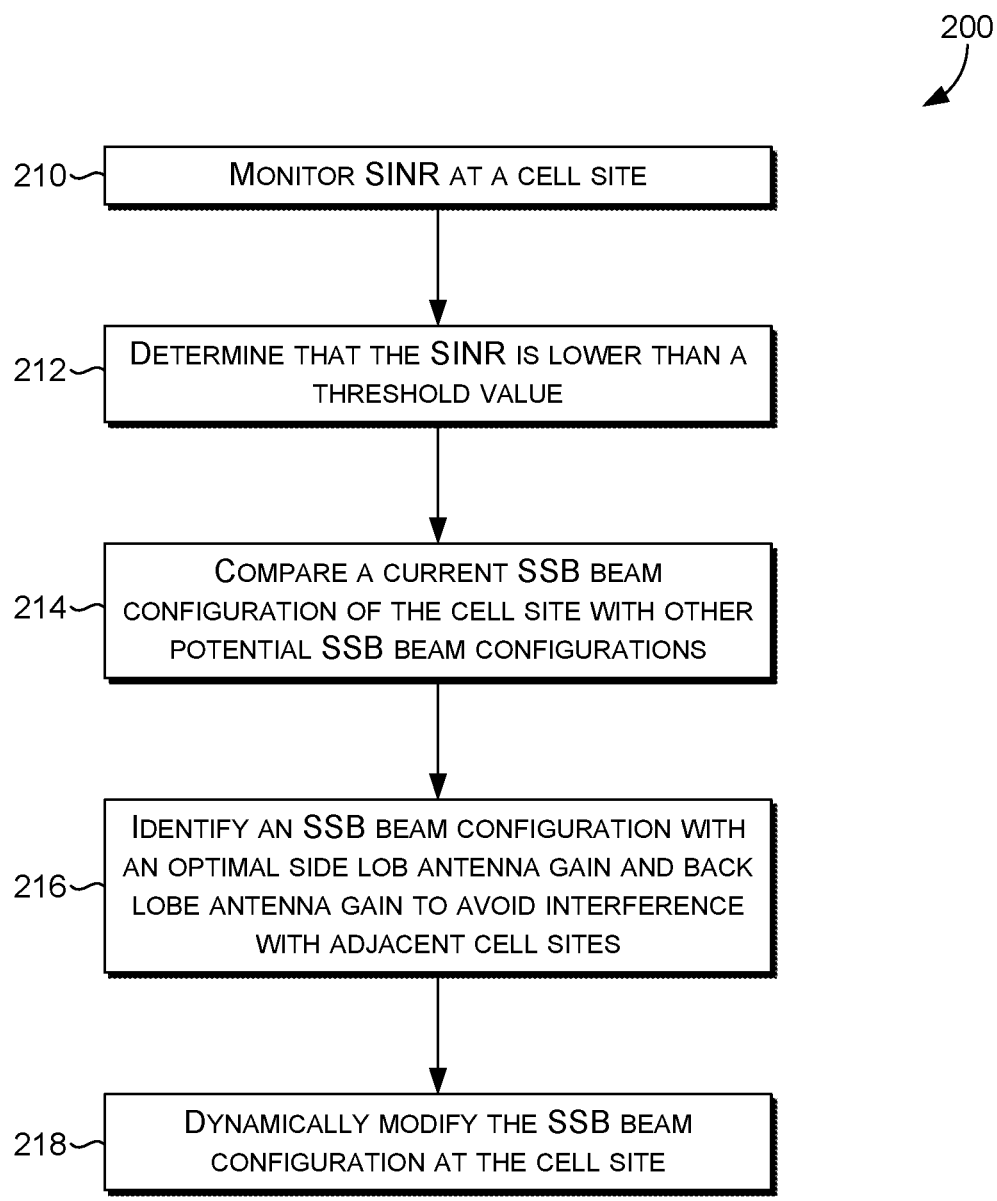
FIG. 2 depicts a flowchart of an exemplary method for dynamically modifying an SSB beam configuration, in accordance with aspects herein.

FIG. 2 depicts a flowchart of an exemplary method 200 for dynamically modifying an SSB beam configuration, in accordance with aspects herein. At block 210, SINR is monitored at a cell site. SINR is one of many types of network efficiency parameters that could be used in aspects herein. Accordingly, it is noted that SINR is used herein for exemplary purposes only and is not meant to be limiting in any way. At block 212, it is determined that the SINR is lower than a threshold value, indicating that degradation has occurred. At block 214, a current SSB beam configuration of the cell site (or sector of the cell site) is compared with other potential SSB beam configurations. For instance, a table in a database may be accessed to identify other SSB beam configurations that could be used for that particular cell site. The different SSB beam configurations available for a particular cell site (or sector of that cell site) may depend on the particular wireless carrier utilizing that cell site, as different bandwidths have different constraints on SSB beam configurations. For instance, some bandwidths can only have up to six SSB beams, while other bandwidths may have more than six SSB beams. The look-up table stored in a database may include not only the available SSB beam configurations, but also information relating to side lobe and back lobe antenna gain and one or more network efficiency parameters. For instance, each available SSB beam configuration may include an associated back lobe and/or side lobe gain value or range, allowing an SSB beam configuration to be selected that would provide the least back lobe and/or side lobe gain to avoid interference issues.

At block 216, an SSB beam configuration with an optimal side lobe antenna gain and back lobe antenna gain is identified or selected. Having less side lobe and back lobe gain may avoid interference, or at least lessen interference with adjacent sectors or cell sites. At block 218, the SSB beam configuration for the cell site or sector of the cell site is dynamically modified. Here, a node, such as an eNodeB or gNodeB, may instruct the antenna array to modify its SSB beam configuration. In some aspects, the dynamic modification of the SSB beam configuration may occur during installation of the antenna array, but in other instances, may occur after installation and during operation of the antenna array.

Figure 3:
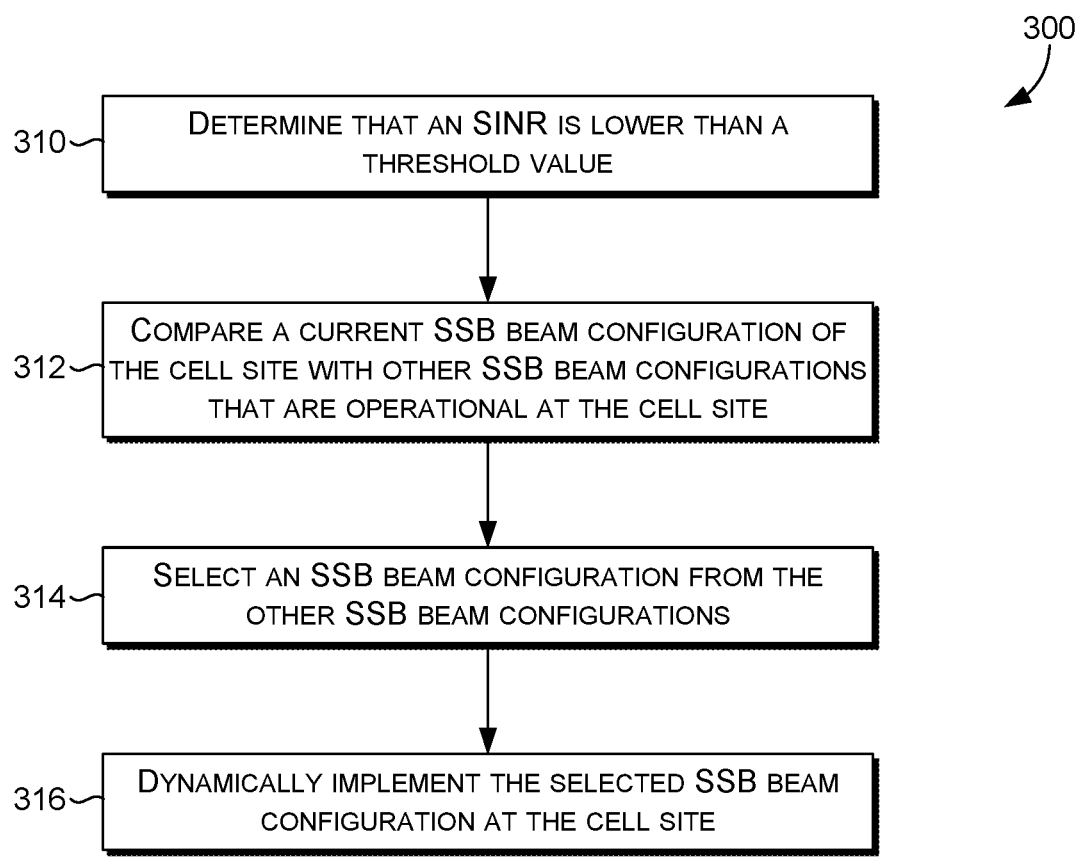
FIG. 3 depicts a flowchart of another exemplary method for dynamically modifying an SSB beam configuration, in accordance with aspects herein.

FIG. 3 depicts a flowchart of another exemplary method 300 for dynamically modifying an SSB beam configuration, in accordance with aspects herein. At block 310, it is determined that a SINR value is lower than a threshold value, indicating SINR degradation. As mentioned above in relation to FIG. 2, SINR is used herein for exemplary purposes only, and is not meant to be limiting in any way. Other network efficiency parameters may be used in addition to or in place of SINR. At block 312, a current SSB beam configuration is compared to other potential SSB beam configurations that would be operational at the cell site. For instance, a table may be accessed from a database that provides information associated with each potential SSB beam configuration operational at that particular cell site. This information could include back lobe and/or side lobe gain information, or network efficiency parameter information which would allow a selection to be made that is optimal for that sector or cell site.

At block 314, an SSB beam configuration is selected from the other SSB beam configurations. At block 316, the selected SSB beam configuration is dynamically implemented at the cell site.

Figure 4:
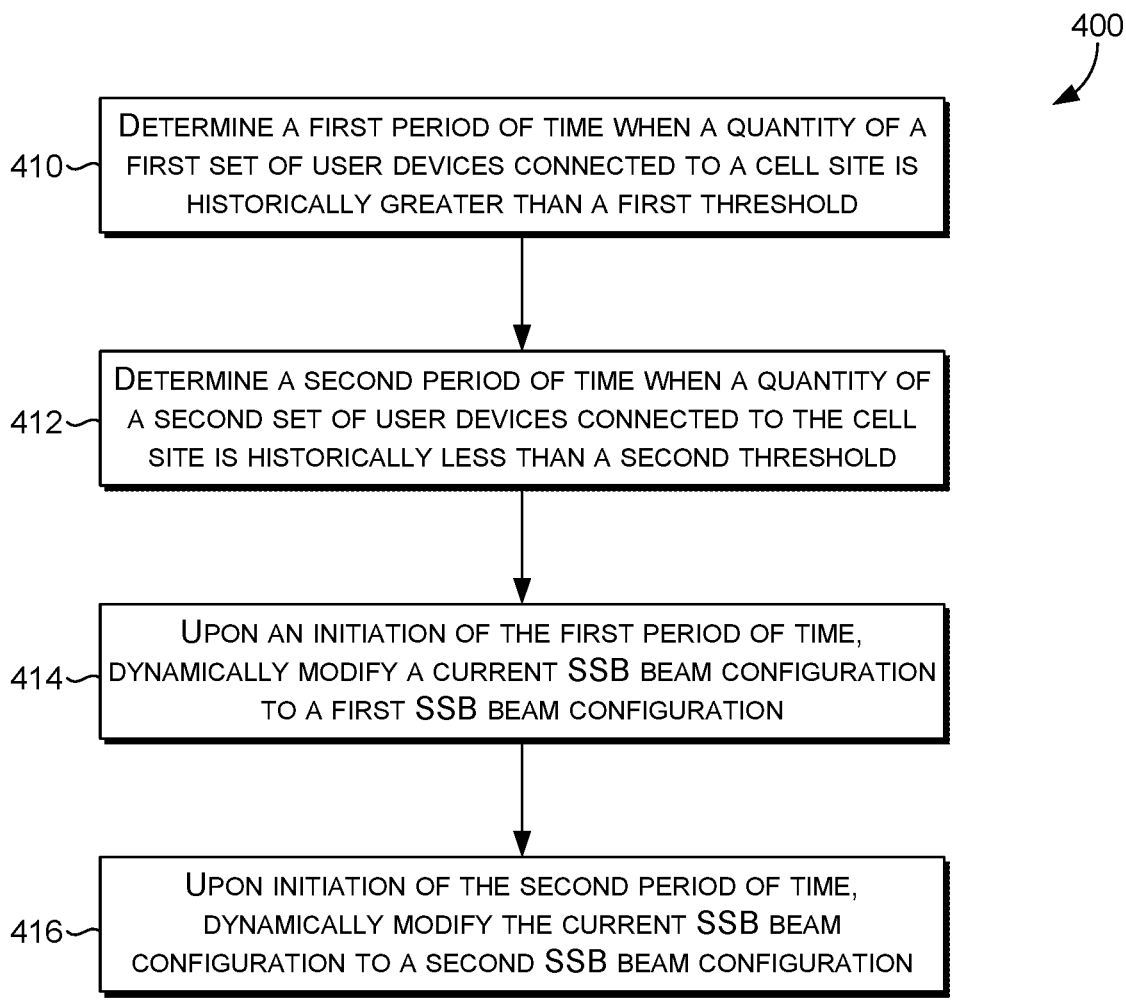
FIG. 4 depicts a flowchart of another exemplary method for dynamically modifying an SSB beam configuration, in accordance with aspects herein.

Turning now to FIG. 4, a flowchart is depicted of another exemplary method 400 for dynamically modifying an SSB beam configuration, in accordance with aspects herein. At block 410, a first period of time is determined when a quantity of a first set of user devices connected to a particular cell site is historically greater than a first threshold. For example, the quantity of user devices may exceed a threshold during peak hours, such as morning and evening times. At block 412, a second period of time is determined when a quantity of a second set of user devices connected to the cell site is historically less than a second threshold. At block 414, upon initiation of the first period of time (e.g., peak hours), a current SSB beam configuration is dynamically modified to a first SSB beam configuration. At block 416, upon initiation of the second period of time, the current SSB beam configuration is dynamically modified to a second SSB beam configuration. While typically the SSB beam configuration would stay static throughout these different periods of time, here, it is dynamically modified based on, at least, a quantity of user devices historically connected to the cell site during various periods of time.

In aspects, the first SSB beam configuration may have more beams than the second SSB beam configuration to accommodate the higher number of user devices connected to the cell site during the first period of time. As such, at blocks 414 and 416, dynamically modifying the SSB beam configuration may increase or decrease a quantity of SSB beams utilized by the antenna array at the cell site. Further, the SSB beam configuration for the first period of time and the second period of time may not be the same each time it is modified, but could depend on side lobe and/or back lobe gain information and one or more network efficiency parameters stored in a database.

Figure 5:
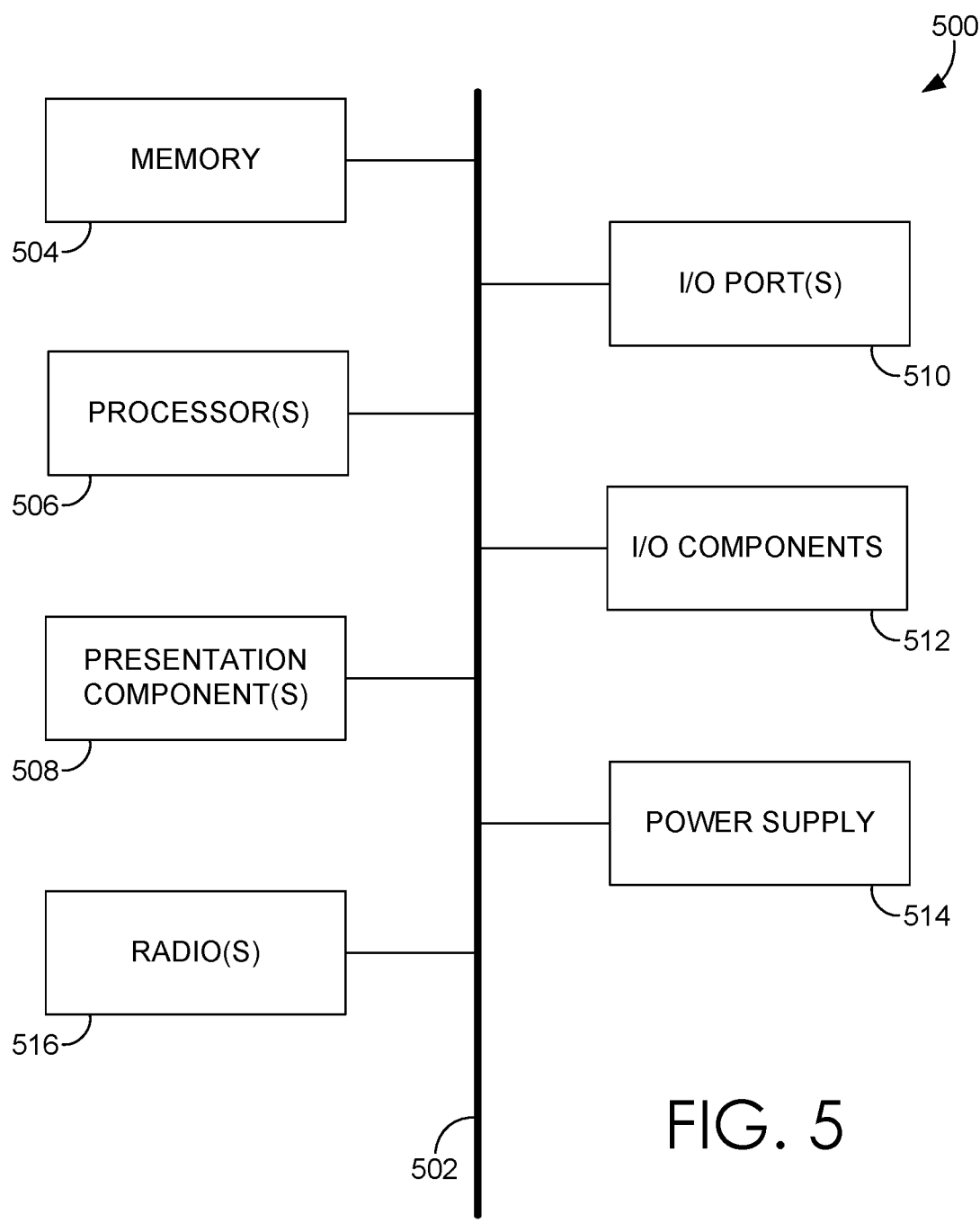
FIG. 5 depicts an exemplary computing device suitable for use in implementations of aspects herein.

Referring to FIG. 5, a block diagram of an example of a computing device 500 suitable for use in implementations of the technology described herein is provided. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated. In aspects, the computing device 500 may be a base station. In another embodiment, the computing device 500 may be UE capable of two-way wireless communications with an access point. Some non-limiting examples of the computing device 500 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 5, computing device 500 includes a bus 502 that directly or indirectly couples various components together. The bus 502 may directly or indirectly one or more of memory 504, processor(s) 506, presentation component(s) 508 (if applicable), radio(s) 510, input/output (I/O) port(s) 512, input/output (I/O) component(s) 514, power supply 516, and/or transmitter(s) 518. Although the components of FIG. 5 are shown with lines for the sake of clarity, in reality, delineating various components is not so clear, and metaphorically, the lines would more accurately be grey and fuzzy. For example, one may consider a presentation component(s) 508 such as a display device to be one of I/O components 514. Also, the processor(s) 506 may include memory 504, in another example. The present disclosure hereof recognizes that such is the nature of the art, and reiterates that FIG. 5 is merely illustrative of an example of a computing device 500 that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 504 may take the form of memory components described herein. Thus, further elaboration will not be provided here, but it should be noted that memory 504 may include any type of tangible medium that is capable of storing information, such as a database or data store. A database or data store may be any collection of records, files, or information encoded as electronic data and stored in memory 504, for example. In one embodiment, memory 504 may include a set of embodied computer-readable and executable instructions that, when executed, facilitate various functions or elements disclosed herein. These embodied instructions will variously be referred to as "instructions" or an "application" for short.

Processor(s) 506 may be multiple processors that receive instructions and process them accordingly. Presentation component(s) 508, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 510 represents one or more radios that facilitate communication with a wireless telecommunications network. For example, radio(s) 510 may be connected to one or more antenna elements through a physical path. Illustrative wireless telecommunications technologies include CDMA, GPRS, TDMA, GSM, and the like. Radio(s) 510 might additionally or alternatively facilitate other types of wireless communications including Wi-Fi, WiMAX, 4G, 3G, 4G, LTE, mMIMO, 5G, NR, VoLTE, and/or other VoIP communications. As can be appreciated, in various embodiments, radio(s) 510 can be configured to concurrently support multiple technologies, as previously discussed herein. As such, each of many radio(s) 510 may be used to separately control portions of an antenna array, for example, where at least one portion utilizes a distinct technology relative to another portion in the same antenna array or at the same base station or cell site. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 512 may take a variety of forms. Exemplary I/O ports 512 may include a USB jack, a stereo jack, an infrared port, a firewire port, other proprietary communications ports, and the like. Input/output (I/O) components 514 may comprise keyboards, microphones, speakers, touchscreens, and/or any other item usable to directly or indirectly input data into the computing device 500.

Power supply 516 may include batteries, fuel cells, and/or any other component that may act as a power source to supply power to the computing device 500 or to other network components, including through one or more electrical connections or couplings. Power supply 516 may be configured to selectively supply power to different components independently and/or concurrently.

Finally, regarding FIGS. 1 through 5, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations can be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code can be performed sequentially such that one instruction is retrieved, loaded, and executed at a time. In some embodiments, retrieval, loading, and/or execution can be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below.

Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method for dynamically modifying an SSB beam configuration, the method comprising:
monitoring SINR at a cell site;
determining that the SINR is lower than a threshold value;
comparing a current SSB beam configuration of the cell site with other potential SSB beam configurations;
based on the comparing, identifying an SSB beam configuration with an optimal side lobe antenna gain and back lobe antenna gain to avoid interference with adjacent cell sites; and
in response to the identifying, dynamically modifying the SSB beam configuration at the cell site.

2. The method of claim 1, wherein the SINR being lower than the threshold value indicates SINR degradation.

3. The method of claim 1, further comprising accessing a look-up table that provides the potential SSB beam configurations for the cell site and associated side lobe antenna gain and back lobe antenna gain associated with each of the potential SSB beam configurations.

4. The method of claim 1, wherein the interference with the adjacent cell sites occurs when the side lobe antenna gain or the back lobe antenna gain is higher than a threshold.

5. The method of claim 1, wherein dynamically modifying the SSB beam configuration at the cell site increases a quantity of SSB beams at the cell site.

6. The method of claim 1, wherein dynamically modifying the SSB beam configuration at the cell site decreases a quantity of SSB beams at the cell site.

7. The method of claim 1, wherein the identifying the SSB beam configuration occurs during installation of antennas at the cell site.

8. The method of claim 1, wherein the identifying the SSB beam configuration occurs during operation of antennas at the cell site.

9. Computer-readable storage media having computer-executable instructions embodied thereon that, when executed by one or more processors, cause the processors to:
determine that an SINR is lower than a threshold value;
compare a current SSB beam configuration of the cell site with other SSB beam configurations that are operational at the cell site;
select an SSB beam configuration from the other SSB beam configurations, the selected SSB beam configuration having an improved side lobe antenna gain and back lobe antenna gain to avoid interference with adjacent cell sites; and
dynamically implement the selected SSB beam configuration at the cell site.

10. The media of claim 9, further comprising accessing a database that includes one or more available SSB beam configurations for the cell site and associated side lobe antenna gain and back lobe antenna gain information.

11. The media of claim 10, wherein the SSB beam configuration is selected based on the one or more available SSB beam configurations for the cell site and the associated side lobe antenna gain and the back lobe antenna gain information.

12. The media of claim 9, wherein the selecting the SSB beam configuration occurs during installation of antennas at the cell site.

13. The media of claim 9, wherein the selecting the SSB beam configuration occurs during operation of antennas at the cell site.

14. A method for dynamically modifying an SSB beam configuration, the method comprising:
determining a first period of time when a quantity of a first set of user devices connected to a cell site is historically greater than a first threshold;
determining a second period of time when a quantity of a second set of user devices connected to the cell site is historically less than a second threshold;
upon an initiation of the first period of time, dynamically modifying a current SSB beam configuration to a first SSB beam configuration; and
upon an initiation of the second period of time, dynamically modifying the current SSB beam configuration to a second SSB beam configuration.

15. The method of claim 14, wherein the first SSB beam configuration has a larger quantity of SSB beams than the current SSB beam configuration.

16. The method of claim 14, wherein the second SSB beam configuration has a smaller quantity of SSB beams than the current SSB beam configuration.

17. The method of claim 14, wherein dynamically modifying a current SSB beam configuration decreases a quantity of SSB beams.

18. The method of claim 14, wherein dynamically modifying a current SSB beam configuration increases a quantity of SSB beams.

19. The method of claim 14, further comprising accessing a database that includes one or more available SSB beam configurations for the cell site and associated side lobe antenna gain and back lobe antenna gain information.

20. The method of claim 19, further comprising selecting the first SSB beam configuration and the second SSB beam configuration based on the one or more available SSB beam configurations for the cell site and the associated side lobe antenna gain and the back lobe antenna gain information.

* * * * *